US006007746A

United States Patent [19]
Murata et al.

[11] Patent Number: 6,007,746
[45] Date of Patent: Dec. 28, 1999

[54] METHOD FOR MANUFACTURING PREFORMS USED IN MOLDING OPTICAL ELEMENTS AND METHOD FOR MANUFACTURING AND MOLDING OPTICAL ELEMENTS

[75] Inventors: Jun Murata; Toshiaki Takano, both of Osaka; Masaaki Sunohara, Hyogo, all of Japan

[73] Assignee: Matsushita Electric Industrial Co., Ltd., Osaka, Japan

[21] Appl. No.: 08/965,955

[22] Filed: Nov. 7, 1997

[30] Foreign Application Priority Data

Nov. 11, 1996 [JP] Japan .................................. 8-299112

[51] Int. Cl.⁶ ...................................... B29D 11/00
[52] U.S. Cl. .............................. 264/1.1; 264/2.4; 264/2.7; 264/71; 425/808
[58] Field of Search ................................. 264/1.1, 2.7, 7, 264/2.2, 2.4, 71; 425/808

[56] References Cited

U.S. PATENT DOCUMENTS

| | | |
|---|---|---|
| 2,298,429 | 10/1942 | Smith . |
| 2,304,217 | 12/1942 | Tillyer . |
| 2,304,663 | 12/1942 | Smith et al. . |
| 2,332,674 | 10/1943 | Smith . |
| 2,432,668 | 12/1947 | Kingston . |
| 3,651,192 | 3/1972 | Erickson . |
| 5,100,590 | 3/1992 | Ruhlin . |
| 5,204,127 | 4/1993 | Prusha . |
| 5,368,790 | 11/1994 | Greshes . |
| 5,593,620 | 1/1997 | Galas . |
| 5,718,850 | 2/1998 | Takano et al. . |
| 5,759,456 | 6/1998 | Watanabe et al. . |

FOREIGN PATENT DOCUMENTS

| | | | |
|---|---|---|---|
| 2 480 667 | 10/1981 | France . | |
| 2 591 525 | 6/1987 | France . | |
| 57-8121 | 1/1982 | Japan . | |
| 57-187224 | 11/1982 | Japan | ..................................... 264/1.1 |
| 59-104916 | 6/1984 | Japan . | |
| 59-212221 | 12/1984 | Japan . | |
| 59-214622 | 12/1984 | Japan . | |
| 60-99618 | 6/1985 | Japan . | |
| 61-132313 | 6/1986 | Japan . | |
| 61-251802 | 11/1986 | Japan . | |
| 62-227730 | 10/1987 | Japan . | |
| 62-278136 | 12/1987 | Japan . | |
| 1-67309 | 3/1989 | Japan . | |
| 1-69313 | 3/1989 | Japan . | |
| 1-174425 | 7/1989 | Japan . | |
| 1-316252 | 12/1989 | Japan . | |
| 2-235729 | 9/1990 | Japan | ..................................... 264/1.1 |
| 5-177725 | 7/1993 | Japan . | |
| 8-127077 | 5/1996 | Japan . | |
| WO 89/02818 | 4/1989 | WIPO . | |

*Primary Examiner*—Mathieu D. Vargot
*Attorney, Agent, or Firm*—Merchant & Gould P.C.

[57] ABSTRACT

A method for manufacturing preforms used in molding optical elements includes: (1) forming an array made from a material for optical elements, in which a plurality of preform portions used in molding optical elements are connected; (2) applying vibration to the outer peripheral part of the preform portion in the thickness direction of the array by a pair of punches; and then (3) punching the preform portions.

19 Claims, 12 Drawing Sheets

6,007,746

METHOD FOR MANUFACTURING PREFORMS USED IN MOLDING OPTICAL ELEMENTS AND METHOD FOR MANUFACTURING AND MOLDING OPTICAL ELEMENTS

FIELD OF THE INVENTION

The present invention relates to a method for manufacturing preforms used in molding optical elements and to a method for manufacturing and molding optical elements. More particularly, the present invention relates to a method for manufacturing preforms used in molding optical elements that are excellent in the surface accuracy of the preforms and in the specularity of a cut surface, and to a method for manufacturing and molding optical elements.

BACKGROUND OF THE INVENTION

It is well known as a conventional method for press-molding optical elements that optical elements can be obtained by setting preforms for molding optical elements, which have been manufactured previously by injection molding, into the space surrounded by an upper mold, a lower mold and a drum mold, and by molding the preforms under heat and pressure, as disclosed, for example, in Japanese laid-open patent application (Tokkai Hei) 8-127077. In this case, as shown in FIG. 10(a), a preform 64 for molding an optical element can be obtained via a gate 61, a runner 62 and a sprue 63. In case of obtaining optical elements by molding the preform 64 under heat and pressure, the preform 64 is cut off from the gate 61, which is used as a single substance, since the preform 64 can be obtained via the gate 61.

It is also well known as a conventional method for press-molding optical elements that optical elements can be obtained by softening a flat member to be processed with heat generated by vibration, and by forcing the member having a molding surface into the softened flat member, as disclosed, for example, in Japanese laid-open patent application (Tokkai Hei) 1-67309. A molding apparatus for carrying out this molding method will be explained as follows. As shown in FIG. 11, an upper die 52 and a lower die 53 are arranged facing each other and are supported by members not shown in the Figure, so that a flat member 54 to be processed, made from resin, can be supported by the upper die 52 and the lower die 53. A through hole 52a is formed along the central axis of the upper die 52, and an upper punch 55 can freely slide up and down in the through hole 52a. A through hole 53a is formed along the central axis of the lower die 53, and a lower punch 56 can freely slide up and down in the through hole 53a. On the end portion of the upper punch 55 and the lower punch 56, molding surfaces for molding optical elements are formed respectively. The lower punch 56 is fixed to a lower frame 57a of a frame 57, through which vibration is provided, and is also connected to an actuator 60 providing vibration, which is installed on the under surface of the lower frame 57a. A through hole 59 is provided in an upper frame 57b of the frame 57. The upper punch 55 is connected to a molding actuator 58 installed on the upper surface of the upper frame 57b, which can freely slide up and down in the through hole 59.

The following explanation is for the method for press molding optical elements using a molding apparatus having such a structure as mentioned above. First, a flat member 54 to be processed is supported by the upper die 52 and the lower die 53 and further the member 54 is firmly supported by shifting the upper punch 55 and the lower punch 56 axially. Next, the actuator 60 providing vibration is actuated and the upper punch 55 and the lower punch 56 are vibrated upwards and downwards by means of the frame 57 through which vibration is provided. As a result, the member 54 is softened with heat generated by self-heating. Then the upper punch is forced into the member 54 by actuating the molding actuator 58 while the actuator 60 providing vibration is operating. Consequently, the shape of the molding surface (the shape of an optical element) formed on the end portion of the upper punch 55 and the lower punch 56 is transferred onto the member 54. Finally, only the part on which the shape of an optical element is transferred is punched from the member 54 by shifting the upper punch 55 and the lower, punch 56 in the same direction, i.e. upwards or downwards. Accordingly, an optical element can be obtained.

However, in the preforms for molding optical elements, which are obtained by injection molding, the resin density near gates is ununiform compared to that of the other part and residual distortion near the gates is considerably high. Therefore, as shown in FIG. 10(b), the rise of temperature during the molding causes a recess 64a near the gate 61. As a result, the recessed part around the gate can get into the clear aperture of optical element 65 as shown in FIG. 12, and thereby a defect in the performance of optical elements might occur.

In the method for manufacturing optical elements by softening a flat member to be processed with heat generated by vibration, and by forcing the member for molding having a molding surface into the softened flat member, a closed space is created between the flat member 54 to be processed and the molding surfaces (recess) 55a and 56a formed on the end portion of the upper punch 55 and the lower punch 56, as shown in FIG. 13(a). As a result, a spatial portion 71 (on which the shape of optical element has not been transferred) might remain on the spherical portion 65a of an optical element 65 as shown in FIG. 13(b), thereby resulting in a defective product. Furthermore, a defect in the performance of optical elements might occur, since the shape of the molding surfaces (recess) 55a and 56a of the upper punch 55 and the lower punch 56 respectively is different, and thereby the precision of the shape transfer at the time of cutting is also different, or since the deviation of the axis of the upper punch 55 and the lower punch 56 causes the deviation of an optical axis in the upper and lower side of the spherical portion of optical elements.

SUMMARY OF THE INVENTION

The present invention is directed to solve the problems mentioned above in the prior art and to provide a method for manufacturing preforms used in molding optical elements that are excellent in the surface accuracy of preforms and in the specularity of a cut surface, and a method for manufacturing and molding optical elements.

In order to achieve the objective mentioned above, a first method for manufacturing preforms used in molding optical elements according to the present invention is characterized by: (1) forming array-form preforms made from a material for optical elements, in which a plurality of preform portions used for molding optical elements are connected; (2) applying vibration to outer peripheral parts of the preform portions in the thickness direction of the array-form preform; and then (3) punching the preform portions and thereby obtaining preforms used for molding optical elements. According to this first method for manufacturing preforms used in molding optical elements, the preform portions used in molding optical elements can be easily punched and the problem of the residual distortion near gates in the conventional product molded by injection molding is also solved, since the outer peripheral part of the preform portions is softened with heat generated by self-heating from the vibration applied to the outer peripheral part of the preform portions in the thickness direction of the array-form preform.

Furthermore, in the first method for manufacturing preforms used in molding optical elements mentioned above, it is preferable: (1) to support the part being punched with a pair of punches having a recessed portion on an end surface; (2) to vibrate the pair of punches in the direction of a central axis; and then (3) to move the pair of punches in the same direction along the central axis. According to this preferable example, the preforms used in molding optical elements can be easily punched by softening the outer peripheral part of the preform portions with heat, which is generated by vibration of a pair of punches in the direction of a central axis, and then by moving the pair of punches in the same direction along the central axis. In this case, it is also preferable: (1) to provide a pair of dies having a through hole in which the pair of punches slide; (2) to support the preforms that have not been punched yet by the pair of dies; (3) to punch the preforms; and then (4) to vibrate the pair of punches in the direction of a central axis. According to this preferable example, the peripheral surfaces of the preforms used in molding optical elements are further softened with heat by rubbing the inner surface of the through hole in a pair of dies and the peripheral surface of the preforms, and the surface roughness of the inner surface of the through hole in the pair of dies is transferred to the peripheral surface of the preforms. The peripheral surface of the preforms used in molding optical elements is a specular surface, since the inner surface of the through hole in the die is generally finished to the surface roughness of 0.5 $\mu$m or less.

Furthermore, in the first method for manufacturing preforms used in molding optical elements mentioned above, the thickness of the preforms that have not been punched yet is preferably between 0.3 mm and 10 mm. According to this preferable example, the non-specularity of the peripheral surface of the preforms or undulation can be prevented.

In the first method for manufacturing preforms used in molding optical elements mentioned above, the material for optical elements is preferably a polyolefin type resin. According to this preferable example, it is not affected by the environmental condition due to low moisture absorption and high heat resistance. As a result, after punching the preforms used in molding optical elements, the peripheral surface is always a specular surface.

In the first method for manufacturing preforms used in molding optical elements mentioned above, it is preferable that array-form preforms are processed by injection molding and the margin for cutting is provided between a gate portion and a preform portion used in molding optical elements. According to this preferable example, the margin for punching can be secured in case of punching and the flow of resins can be controlled at the time of injection molding.

A second method for manufacturing preforms used in molding optical elements according to the present invention is characterized by: (1) forming plate-form preforms made from a material for optical elements; (2) applying vibration to outer peripheral parts of an arbitrary area of the plate-form preforms in the thickness direction of the plate-form preforms; and then (3) punching the arbitrary area and thereby obtaining the preforms used for molding optical elements. According to the second method, the inexpensive preforms used in molding optical elements can be realized, since the inexpensive plate-form preforms can be utilized.

In the second method for manufacturing preforms used in molding optical elements mentioned above, it is preferable: (1) to support the part being punched with a pair of punches having a recessed portion on an end surface; (2) to vibrate the pair of punches in the direction of a central axis; and then (3) to move the pair of punches in the same direction along the central axis. In this case, it is also preferable: (1) to provide a pair of dies having a through hole in which the pair of punches slide; (2) to support the preforms that have not been punched yet by the pair of dies; (3) to punch the preforms; and then (4) to vibrate the pair of punches in the direction of a central axis.

Furthermore, in the second method for manufacturing preforms used in molding optical elements mentioned above, the thickness of the preforms that have not been punched yet is preferably between 0.3 mm and 10 mm.

In the second method for manufacturing preforms used in molding optical elements mentioned above, the material for optical elements is preferably a polyolefin type resin.

The method for manufacturing optical elements according to the present invention is characterized by: (1) forming array-form preforms made from a material for optical elements, in which a plurality of optical element portions are connected; (2) applying vibration to the outer peripheral part of the optical element portions in the thickness direction of the array-form preforms; and then (3) punching the optical element portions and thereby obtaining optical elements. According to this method for manufacturing optical elements, the optical element portions can be easily punched and the problem of the residual distortion near gates in the conventional product molded by injection molding is also solved, since the outer peripheral part of the optical element portions is softened with heat generated by self-heating from the vibration applied to the outer peripheral part of the optical element portions in the thickness direction of the array-form preform.

Further, in the method for manufacturing optical elements, it is preferable: (1) to support the optical element portions by a pair of punches having a recessed portion on an end surface; (2) to vibrate the pair of punches in the direction of a central axis; and then (3) to move the pair of punches in the same direction along the central axis. In this case, it is also preferable: (1) to provide a pair of dies having a through hole in which the pair of punches slide; (2) to support the array-form preforms by the pair of dies; (3) to punch the optical elements; and then (4) to vibrate the pair of punches in the direction of a central axis.

Furthermore, in the method for manufacturing optical elements mentioned above, the thickness of the array-form preforms is preferably between 0.3 mm and 10 mm.

In the method for manufacturing optical elements mentioned above, the material for optical elements is preferably a polyolefin type resin.

In the method for manufacturing optical elements mentioned above, it is preferable that array-form preforms are processed by injection molding and the margin for cutting is provided between a gate portion and an optical element portion.

A first method for molding optical elements according to the present invention is characterized by: (1) forming array-form preforms made from a material for optical elements, in which a plurality of preform portions used for molding optical elements are connected; (2) applying vibration to outer peripheral parts of the preform portions in the thickness direction of the array-form preform; then (3) punching the preform portions and thereby obtaining preforms used for molding optical elements; and (4) molding the preform by applying pressure and heat. According to this first method for molding optical elements, since the preforms used in molding the optical elements have no problem of the residual distortion near gates found in the conventional product molded by injection molding, even if the temperature rises during the molding, no distorted peripheral part can get into the clear aperture of an optical element and the defect in the performance of optical elements does not occur.

Furthermore, in the first method for molding optical elements according to the present invention, it is preferable: (1) to support the portion being punched with a pair of punches having a recessed portion on an end surface; (2) to vibrate the pair of punches in the direction of a central axis; and then (3) to move the pair of punches in the same direction along the central axis. In this case, it is also preferable: (1) to provide a pair of dies having a through hole in which the pair of punches slide); (2) to support the preforms that have not been punched yet by the pair of dies; (3) to punch the preforms; and then (4) to vibrate the pair of punches in the direction of a central axis.

Furthermore, in the first method for molding optical elements mentioned above, the thickness of the preforms that have not been punched yet is preferably between 0.3 mm and 10 mm.

In the first method for molding optical elements mentioned above, it is preferable that an outer diameter Y of a preform used in molding optical elements is determined so that a relation $E \leq Y \leq X$ could hold, wherein E is the diameter of a clear aperture of an optical element and X indicates an outer diameter of an optical element. According to this preferable example, the defect in shape of optical elements does not occur, since the outer part of the preform does not get into the clear aperture during the molding.

In the first method for molding optical elements mentioned above, the material for optical elements is preferably a polyolefin type resin.

In the first method for molding optical elements mentioned above, it is preferable that array-form preforms are processed by injection molding and the margin for cutting is provided between a gate portion and a preform portion used in molding optical elements.

A second method for molding optical elements according to the present invention is characterized by: (1) forming plate-form preforms made from a material for optical elements; (2) applying vibration to outer peripheral parts of an arbitrary area of the plate-form preforms in the thickness direction of the plate-form preform; then (3) punching the arbitrary area and thereby obtaining the preforms used for molding optical elements; and (4) molding the preform by applying pressure and heat. According to the second method for molding optical elements mentioned above, the inexpensive optical elements can be realized, since the inexpensive plate-form preform can be used.

In the second method for molding optical elements mentioned above, it is preferable: (1) to support the portion being punched with a pair of punches having a recessed portion on an end surface; (2) to vibrate the pair of punches in the direction of a central axis; and then (3) to move the pair of punches in the same direction along the central axis. In this case, it is also preferable: (1) to provide a pair of dies having a through hole in which the pair of punches slide; (2) to support the preforms that have not been punched yet by the pair of dies; (3) to punch the preforms; and then (4) to vibrate the pair of punches in the direction of a central axis.

Furthermore, in the second method for molding optical elements mentioned above, the thickness of the preforms that have not been punched yet is preferably between 0.3 mm and 10 mm.

In the second method for molding optical elements mentioned above, it is preferable that an outer diameter Y of a preform used in molding optical elements is determined so that a relation $E \leq Y \leq X$ could hold, wherein E is the diameter of a clear aperture of an optical element and X indicates an outer diameter of an optical element.

In the second method for molding optical elements mentioned above, the material for optical elements is preferably polyolefin type resin.

BRIEF DESCRIPTION OF THE DRAWINGS

With regard to the drawings attached hereto.

DETAILED DESCRIPTION OF THE PREFERRED EMBODIMENTS

[First Embodiment]

Figure 1A:
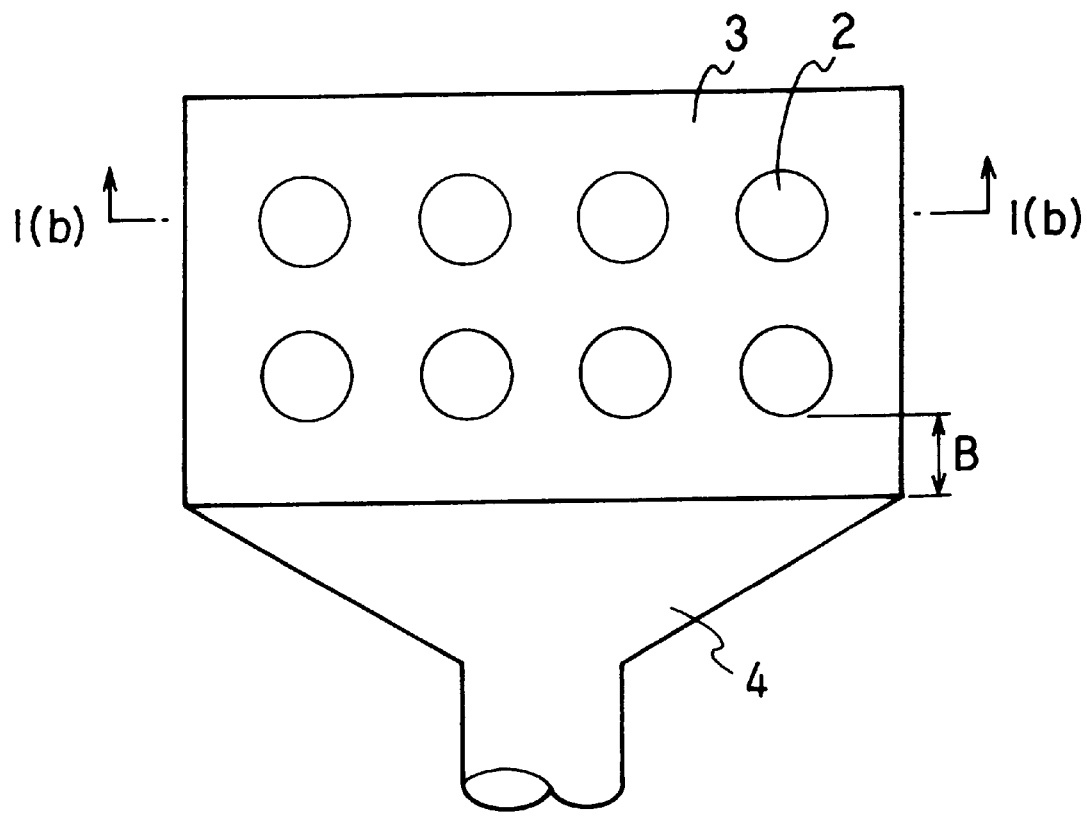
FIG. 1(a) is a plan view illustrating an array composed of a plurality of preform portions used in molding optical elements in the first embodiment of the present invention.
Figure 1B:
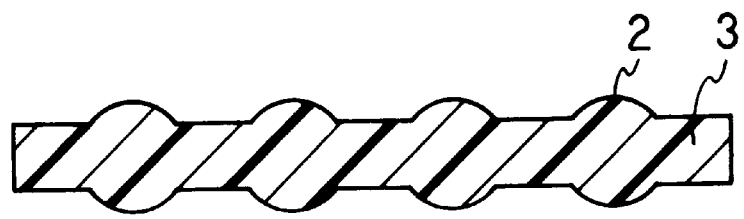
FIG. 1(b) is a cross sectional view taken along lines A—A of FIG. 1(a)

FIG. 1(a) is a plan view illustrating an array-form preform for molding optical elements used in a method for manufacturing preforms used in molding optical elements in the first embodiment of the present invention. FIG. 1(b) is a cross sectional view taken along lines A—A of FIG. 1(a).

Figure 4:
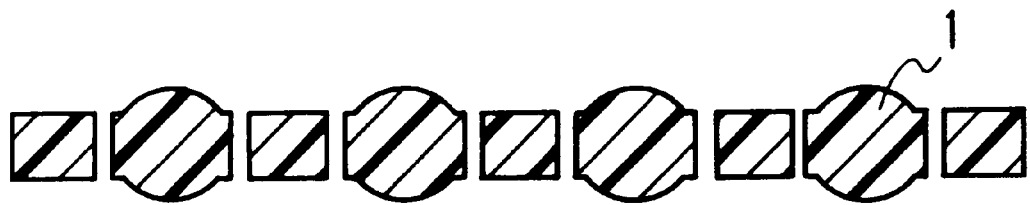
FIG. 4 is a cross sectional view illustrating the preforms used in molding optical elements that have been punched from the array in the first embodiment of the present invention.

Preforms used in molding optical elements in this embodiment are manufactured as follows. First, as shown in FIGS. 1(a) and i(b), using polyolefin type resin such as polyethylene, polypropylene or the like, preform is molded into a form of an array 3 by injection molding, in which a plurality of preform portions 2 used in molding optical elements are connected. The shape of the preform portion 2 used in molding optical elements is spherical whose radius of curvature is 2.5 mm. The array 3 is obtained through a gate 4. A fixed interval B is provided between the gate 4 and the preform portion 2 which is in the position nearest to the gate 4. This interval B secures a margin for punching at the time of the vibration-pressure cutting mentioned below, and it is also necessary to control the flow of resins at the time of injection molding. The optimum value of the interval B is determined by the size of the preform portion 2 and the number of the preforms that are obtained from the sheet of array 3. In this embodiment, an outer dimension of the array 3 is 40 mm×30 mm×6 mm and the outer diameter of the preform portion 2 is 6 mm, the thickness of the central part 8 mm and the radius of curvature of spherical part 2.5 mm. In this case, the interval B is 6 mm. A sheet of array 3 may be molded by injection molding, which is carried out once, or plural sheets of array 3 may be molded at a time by injection molding, which is carried out once. As shown in FIG. 4, a single preform 1 used in molding an optical element can be obtained by cutting off the preform portion 2 from the array 3 by cutting wherein vibration is provided while pressure is applied (hereafter referred to as vibration-pressure cutting).

Next, a cutting apparatus, in which vibration is provided while pressure is applied, will be explained. This apparatus is used in the method for manufacturing preforms for molding optical elements in this embodiment.

Figure 2:
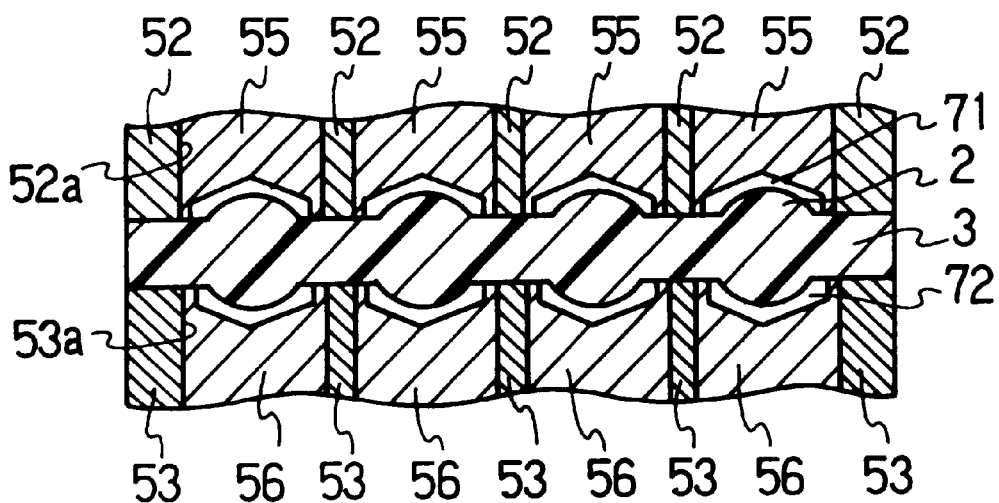
FIG. 2 is a cross sectional view illustrating the periphery of the punch in the cutting apparatus, in which vibration is provided while pressure is applied, in the first embodiment of the present invention.
Figure 11:
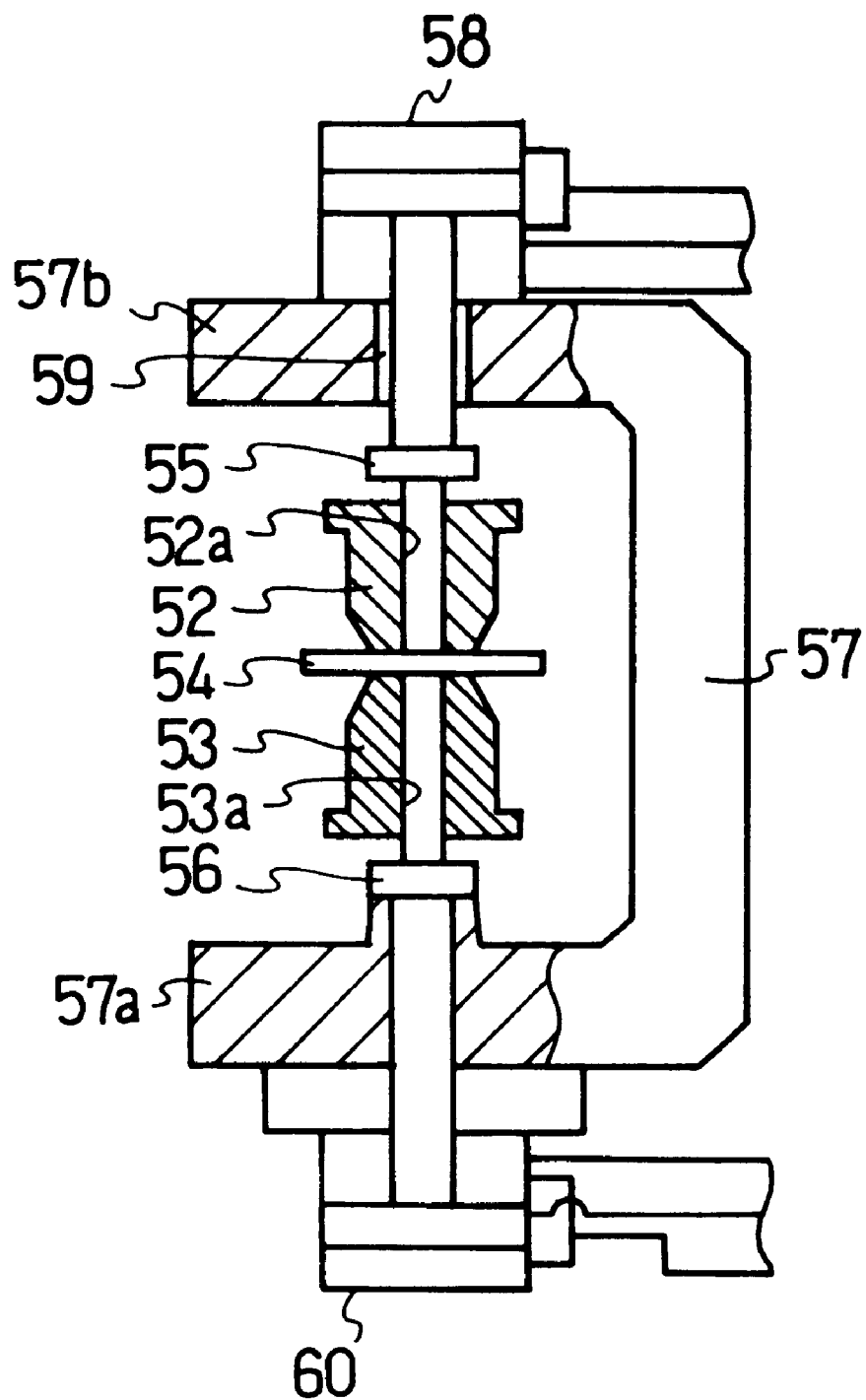
FIG. 11 is a cross sectional view partially broken illustrating a molding apparatus used in the method for press-molding optical elements in the prior art.
Figure 12:
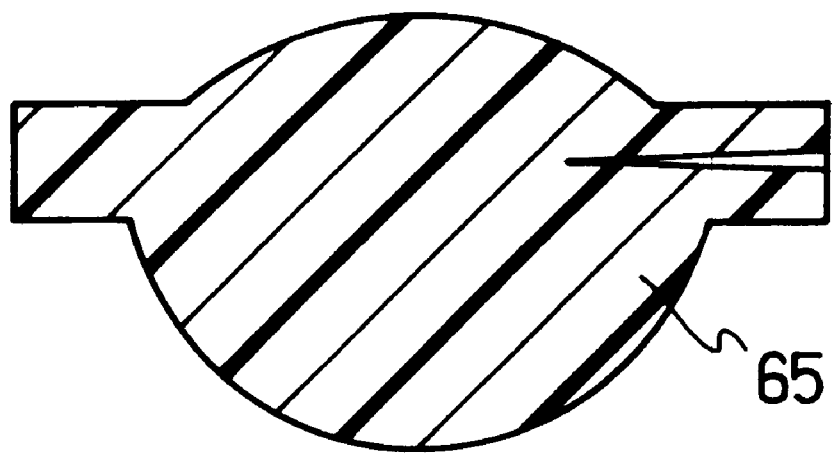
FIG. 12 is a cross sectional view illustrating an optical element molded by using preforms used in molding optical elements, which are obtained by injection molding in the prior art.
Figure 13A:
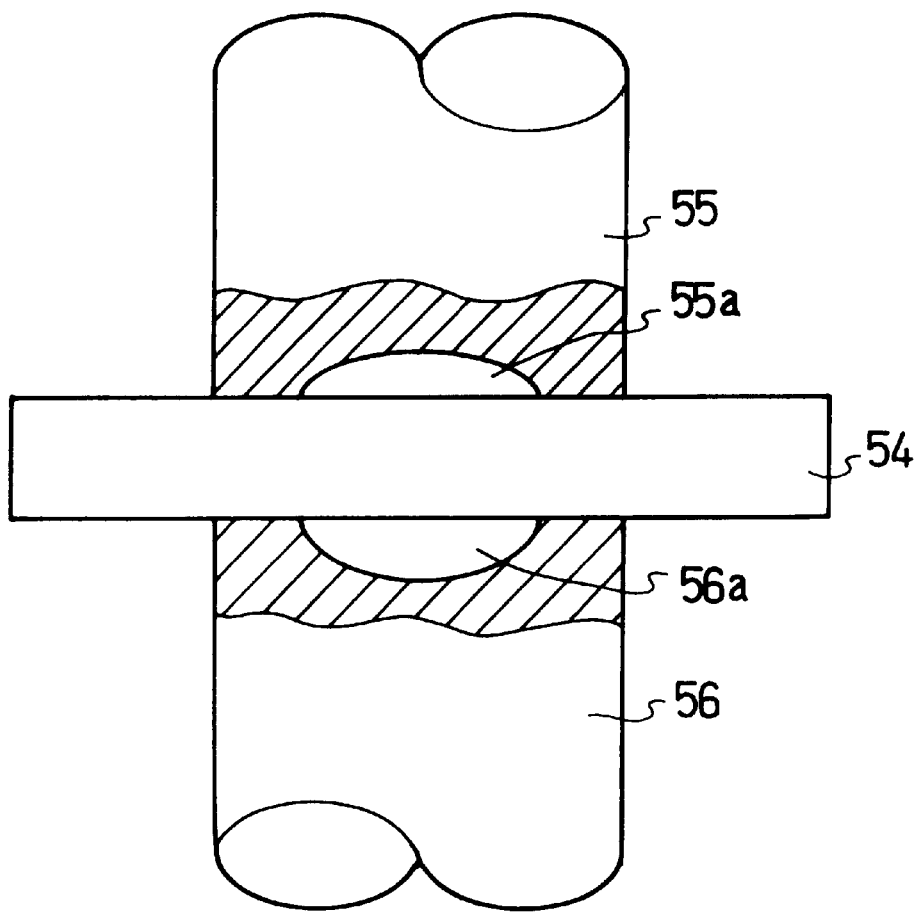
FIG. 13(a) is a cross sectional view partially broken illustrating a method for manufacturing optical elements by softening a flat member to be processed with heat generated by vibration, and by pressing and molding the member for molding having a molding surface in the prior art.
Figure 13B:
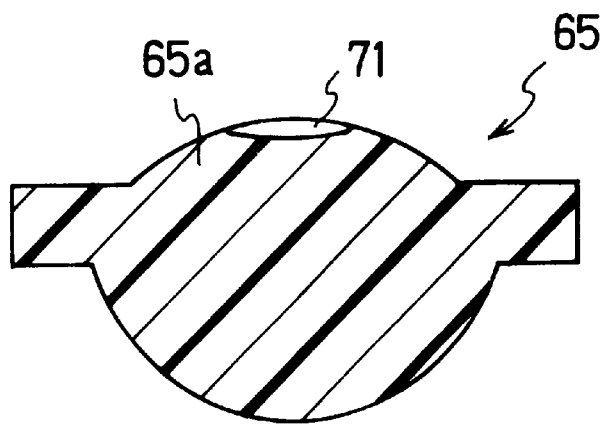
FIG. 13(b) is a cross sectional view illustrating an optical element obtained by the method illustrated in FIG. 13(a).

The structure of the cutting apparatus is almost same as that of the molding apparatus shown in FIG. 11. However, it is different from that of the molding apparatus shown in FIG. 11 in providing a plurality of upper punches 55 and lower punches 56 and also in the shape of the end portions of the upper punch 55 and the lower punch 56. As shown in FIG. 2, the upper die 52 and the lower die 53 made from SKH51 are arranged facing each other and are supported by members not shown in the Figure, so that the array 3 can be supported by the upper die 52 and the lower die 53. In the upper die 52, a plurality of through holes 52a are formed in a position corresponding to each preform portion 2 of the array 3. Each upper punch 55 made from SKH51 (C:0.5%; Cr:4.6%; W:2.0%; Mo:3.0%; and V:1.0%) can freely slide up and down in each through hole 52a. Similarly, in the lower die 53, a plurality of through holes 53a are formed in a position corresponding to each preform portion 2 in the array 3. Each lower punch 56 made from SKH51 can freely slide up and down in each through hole 53a. On the end surface of the upper punch 55 and the lower punch 56, the recessed portions 71 and 72 are formed respectively, which are larger than the spherical part of the preform portion 2 in the array 3. Consequently, the outer peripheral part of each preform portion 2 in the array 3 can be cut by the upper punch 55 and the lower punch 56 while maintaining the shape of the preform portion 2. A molding actuator is not needed in the cutting apparatus, in which vibration is provided while pressure is applied, although a molding actuator 58 is provided in the molding apparatus shown in FIG. 11. However, it is same as in the molding apparatus shown in FIG. 11 that the upper punch 55 and the lower punch 56 vibrate in the direction of the central axis (up and down) through a frame 57 through which vibration is provided by operating an actuator 60 providing vibration in this apparatus.

Figure 3:
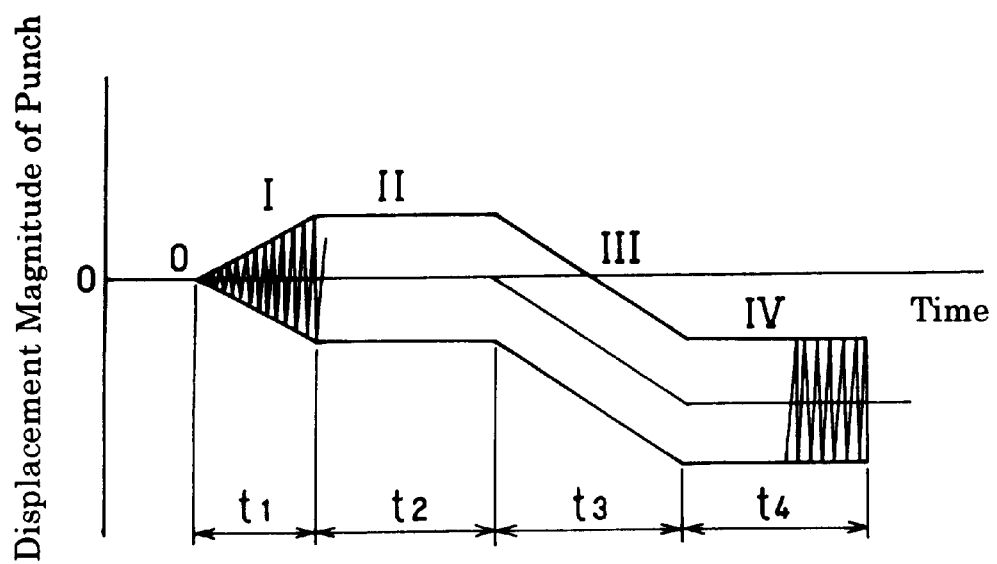
FIG. 3 is a sequence diagram for the cutting apparatus (hereafter referred to as vibration-pressure cutting apparatus) in which vibration is provided while pressure is applied in the first embodiment of the present invention.

Using the cutting apparatus in which vibration is provided while pressure is applied and having the structure mentioned above, the method for manufacturing preforms used in molding optical elements will be explained referring to the sequence diagram shown in FIG. 3.

The following Table 1 shows each value under the conditions of the vibration-pressure cutting and in the operation sequence.

TABLE 1

| Punch Pressure (Mpa) | Die Pressure (Mpa) | Frequency (Hz) | Amplitude (mm) |
|---|---|---|---|
| 100 | 150 | 50 | 0.3 |
| | | | (sec) |
| $t_1$ | $t_2$ | $t_3$ | $t_4$ |
| 0.5 | 0.5 | 0.5 | 0.5 |

Figure 5:
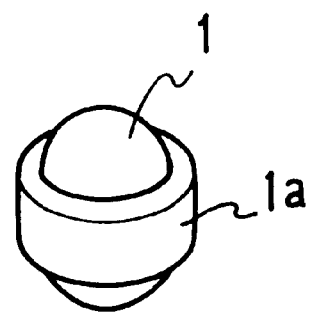
FIG. 5 is a perspective view illustrating the preform used in molding an optical element obtained in the first embodiment of the present invention.

The fixed space is provided between the upper die 52 and the lower die 53 and between the upper punch 55 and the lower punch 56. The array 3 is set into the space. The array 3 is supported by the upper die 52 and the lower die 53, and, furthermore, the array 3 is firmly supported by sliding the upper punch 55 and the lower punch 56 along the central axis in order to be close each other (FIG. 2). Then, the actuator 60 (FIG. 11) providing vibration is operated, so that the upper punch 55 and the lower punch 56 vibrate in the direction of the central axis (up and down) through the frame 57 (FIG. 11) through which vibration is provided. After the elapse of $t_1$=0.5 see after the actuator 60 providing vibration is operated, the amplitude of vibration of the upper punch 55 and the lower punch 56 becomes 0.3 mm (Area I in FIG. 3). Maintaining this amplitude, the upper punch 55 and the lower punch 56 vibrate up and down further for $t_2$=0.5 sec (Area II in FIG. 3). As a result, the contact surface (the outer peripheral part of the preform portion 2) between the array 3 and the upper punch 55 and the lower punch 56 is softened with heat generated by self-heating. The upper punch 55 and the lower punch 56 are made to shift downwards for $t_3$=0.5 sec while supporting the array 3 with the upper punch 55 and the lower punch 56 (Area III in FIG. 3). Consequently, each preform portion 2 in the array 3 is punched, and thereby a single preform 1 used in molding optical element can be obtained (see FIG. 4). In this case, the preform portion 2 can be easily punched from the array 3, since the contact surface (the outer peripheral part of the preform portion 2) between the array 3 and the upper punch 55 and the lower punch 56 is softened with heat, resulting in the low shearing strength of this part. Vibration is continuously provided to the upper punch 55 and the lower punch 56 in the direction of the central axis (up and down) further for $t_4$=0.5 sec while maintaining the preforms 1, which have been obtained by punching the preform portions 2 in the array 3, by the upper punch 55 and the lower punch 56 (Area IV in FIG. 3). As a result, the outer peripheral surface of the preform 1 is rubbed with the inner surfaces of the through hole 52a of the upper die 52 and of the through hole 53a of the lower die 53, and the outer peripheral surface of the preform 1 is further softened. The surface roughness of the inner surfaces of the through hole 52a in the upper die 52 and of the through hole 53a in the lower die 53 is transferred to the outer peripheral surface of the preform 1. In this case, the outer peripheral surface 1a of the preform 1 obtained is a specular surface as shown in FIG. 5, since the surface roughness of the inner surfaces of the through hole 52a in the upper die 52 and of the through hole 53a in the lower die 53 is finished to be a specular surface with a surface roughness of 0.5 μm or less. Then, the upper punch 55 and the lower punch 56 are put back to the initial position, and then the fixed space is provided between the upper die 52 and the lower die 53 and between the upper punch 55 and the lower punch 56. Finally, the preform 1 used in molding an optical element is taken out.

The thickness of the array 3 has a significant effect on the conditions of the vibration-pressure cutting. That is, in case where the thickness of the array 3 is less than 0.3 mm or more than 10 mm, the specularity of the cut surface 1a of the preform 1 can not be obtained or undulation occurs. In order to prevent such inconvenience, the thickness of the array 3 is preferably between 0.3 mm and 10 mm.

As mentioned above, the cutting surface of the preform 1 obtained in this embodiment is a specular surface. It means that the gate has no effect on the cutting portion of the preform 1 obtained in this embodiment and the uniform distortion can be provided all around the outer peripheral part. Consequently, the high quality outer diameter portion of the molded optical elements also can be realized, which can be obtained in the second embodiment according to the present invention using this preform 1.

In this embodiment, the preform 1 composed of outer peripheral chip portion and spherical surface portion was obtained using the array 3, in which a plurality of preform portions 2 are connected (see FIG. 4 and FIG. 5). However, it is not always necessary to use array-form preforms. A plate-form preform may be used for obtaining a columnar preform used in molding optical elements. An inexpensive preform used in molding optical elements can be realized by using such a plate-form preforms. Also in this case, the thickness of the plate-form preforms is preferably between 0.3 mm and 10 mm for the reason mentioned above.

In this embodiment, polyolefin type resin is used as a material for optical elements. However, it should not be limited, and another materials for optical elements can be used, for example, acrylic resins, polycarbonate and the like.

[Second Embodiment]

Figure 6A:
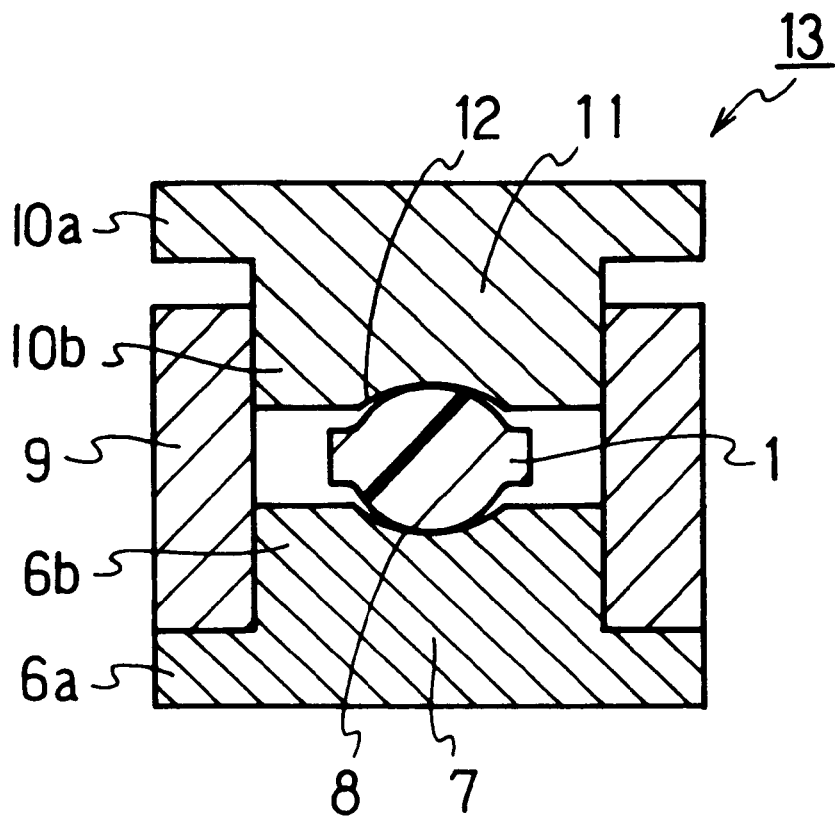
FIG. 6(a) is a cross sectional view illustrating the mold used in the method for molding an optical element in the second embodiment of the present invention.
Figure 6B:
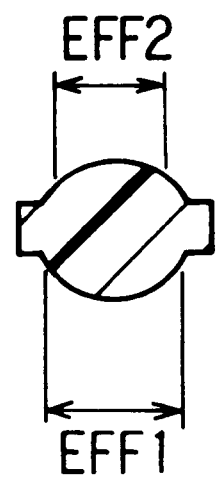
FIG. 6(b) is a cross sectional view illustrating the preform used in molding an optical element in the second embodiment of the present invention.
Figure 7:
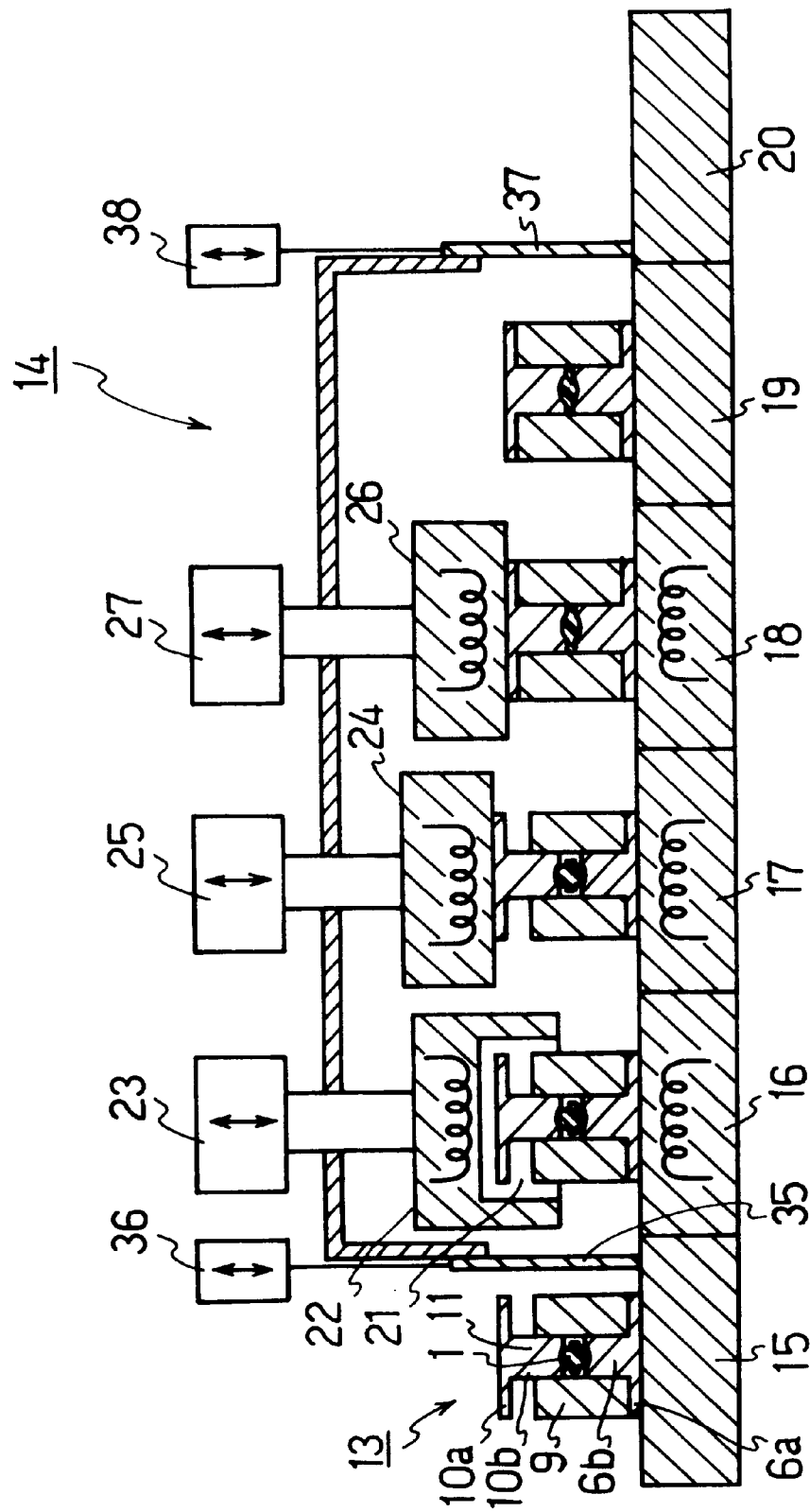
FIG. 7 is a cross sectional view illustrating a molding apparatus used in the method for molding optical elements in the second embodiment of the present invention.

FIG. 6(a) is a cross sectional view illustrating the mold used in the method for molding optical element in the second embodiment of the present invention and FIG. 6(b) is a cross sectional view illustrating the preforms used in molding optical elements in the second embodiment of the present invention. FIG. 7 is a cross sectional view illustrating a molding apparatus used in the method for molding optical elements in the second embodiment of the present invention.

As shown in FIG. 6(a), a recess 8 having the radius of curvature of 3 mm is formed on the upper surface of a convex part 6b in a lower mold 7 having a flange 6a and the convex part 6b. The convex part 6b of the lower mold 7 is inserted into a cylindrical drum mold 9. An upper mold 11 having a flange 10a and a convex part 10b is arranged over the lower mold 7 so that the upper mold 11 can freely slide up and down in the drum mold 9. On the lower surface of the convex part 10b in the upper mold 11, a recess 12 having the radius of curvature of 5 mm is formed in the position facing the recess 8 of the lower mold 7. Thus, the mold 13 is composed of these elements. The preform 1 obtained in the first embodiment mentioned above is put into the recess 8 of the lower mold 7 and then the upper mold 11 is lowered. Thereby the preform 1 can be molded by pressure.

As shown in FIG. 7, the lower part of a molding apparatus 14 includes a preliminary stage 15, a heating stage 16, a molding stage 17, a cooling stage 18, a water-cooling stage 19 and an exit stage 20 that are horizontally arranged in order in the transverse direction. The mold 13 into which the preform 1 used in molding optical elements has been put is moved to the preliminary stage 15 by a robot arm or the like (not shown), and then the mold 13 can be carried to the other stage one after another by a carrier arm or the like (not shown). A heater is contained in each of the heating stage 16, the molding stage 17 and the cooling stage 18, so that the temperature of each stage can be set at the predetermined temperature. The mold 13 is carried to the next stage for each predetermined setting time, and the preforms 1 put into the molds 13 are continuously molded one after another. In this embodiment, the predetermined setting time is set at 60 sec.

Over the heating stage 16, the heating head 22 having a recessed portion 21 on its lower surface is arranged. The heating head 22 can go up and down by an air cylinder 23. Over the molding stage 17, a molding head 24 is arranged. The molding head 24 can go up and down by an air cylinder 25. Over the cooling stage 18, a cooling head 26 is arranged. The cooling head 26 can go up and down by an air cylinder 27. A heater is contained in each of the heating head 22, the molding head 24 and the cooling head 26, so that the temperature of each head can be set at the predetermined temperature. A door 35 is provided between the preliminary stage 15 and the heating stage 16. The door 35 can move up and down by an air cylinder 36. A door 37 is also provided between the cooling stage 19 and the exit stage 20 and it can also move up and down by an air cylinder 38.

The setting temperature of each stage and head according to this embodiment is shown in Table 2.

TABLE 2

| | Temperature Condition in Molding Apparatus (° C.) | | |
|---|---|---|---|
| | Heating Stage | Molding Stage | Cooling Stage |
| Head | 160 | 170 | 100 |
| Stage | 160 | 170 | 100 |

The outer dimension of the preform 1 used in molding optical elements is bigger than the clear apertures EFF1 and EFF2 of the mold 13, which are corresponding to the clear aperture of an optical element (see FIG. 6(b)), and it is smaller than the outer diameter of an optical element, i.e. the inner diameter of the drum mold 9. When each size is determined in order to fulfill such a relationship, the defect in the shape of optical elements does not occur, which is caused by an outer part of the preform 1 getting into the clear aperture during the molding.

Figure 8:
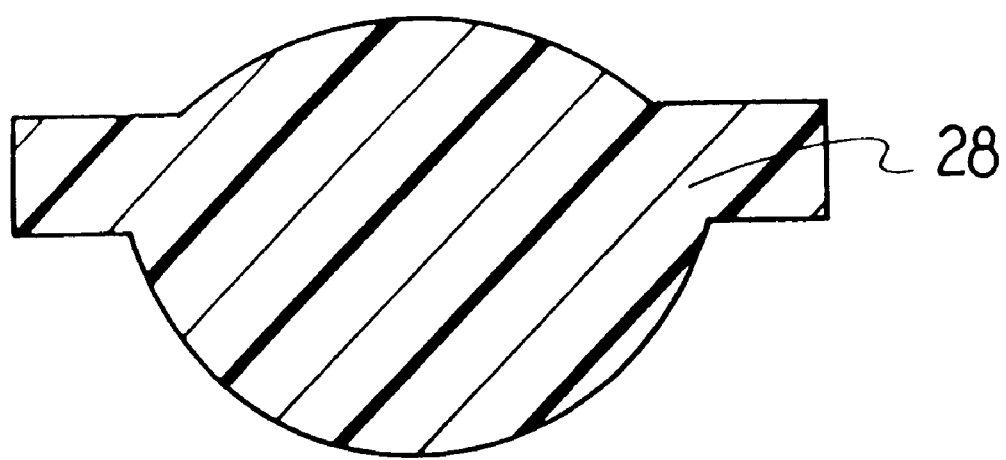
FIG. 8 is a cross sectional view illustrating an optical element obtained in the second embodiment of the present invention.

A method for molding preforms for optical elements using the mold and the molding apparatus that is composed as mentioned above will be explained as follows. Firstly, the preform 1 used in molding optical elements is put into the mold 13, which is then moved to the preliminary stage 15 by a robot arm not shown. Next, the mold 13 is carried to the heating stage 16 by a carrier arm not shown. When the mold 13 is carried to the heating stage 16, the air cylinder 23 operates and the heating head 22 goes down. In this case, the upper part of the mold 13 is inserted in the recessed portion 21 of the heating head 22, but the mold 13 is not in contact with the heating head 22. After heating the mold 13 in this condition, the mold 13 is carried to the molding stage 17 by a carrier arm. When the mold 13 is carried to the molding stage 17, the air cylinder 25 operates and the molding head 24 goes down. As a result, pressure is applied to the upper mold 11 of the mold 13 by the molding head 24. The pressure applied by the molding head 24 is set by controlling the air volume of the air cylinder 25. In this embodiment, the pressure applied by the molding head 24 is set at 50 kg/cm$^2$. The flange 10a of the upper mold 11 is in contact with the upper end part of the drum mold 9 at the end of the predetermined setting time in the molding stage 17. At this time, the shapes of the recess 8 of the lower mold 7 and the recess 12 of the upper mold 11 are transferred to the preform 1, so that the preform 1 has a shape of an optical element 28 (see FIG. 8). The mold 13 is then carried to the cooling stage 18 by a carrier arm. When the mold 13 is carried to the cooling stage 18, the air cylinder 27 operates and the cooling head 26 goes down, so that the cooling head 26 comes into contact with the upper mold 11 of the mold 13. In this condition, the mold 13 is cooled to the temperature not changing the shape of the preform 1 (a shape of optical element) molded at the molding stage 17. Finally, after the mold 13 is carried to the water-cooling stage 19 and then to the exit stage 20 by a carrier arm, the mold 13 is disassembled and an optical element 28 is taken out.

Figure 9A:
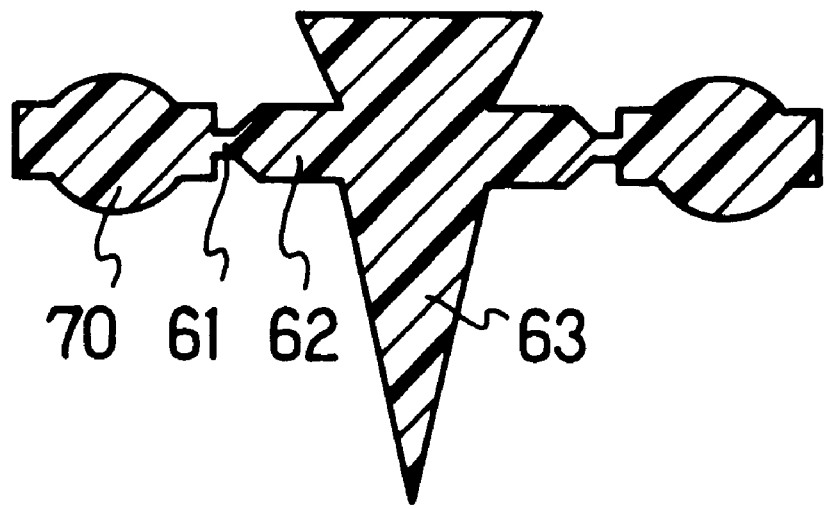
FIGS. 9(a) and 9(b) are cross sectional views illustrating optical elements obtained by injection molding in the prior art.
Figure 9B:
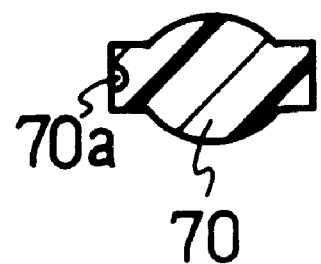
Figure 10A:
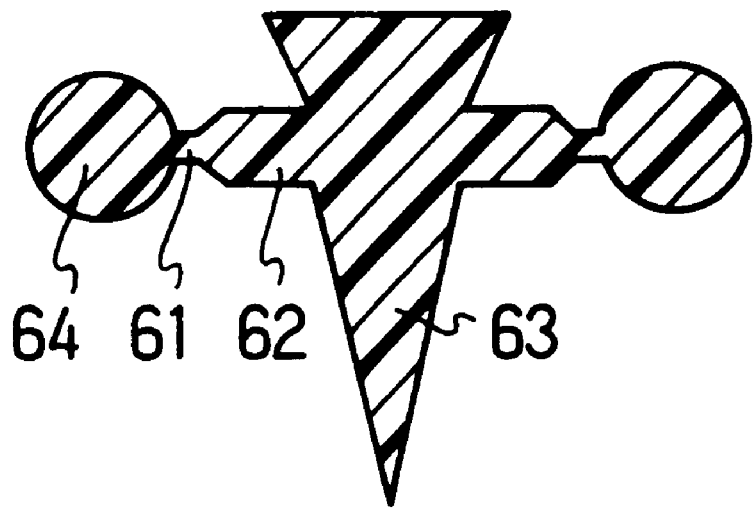
FIGS. 10(a) and 10(b) are cross sectional views illustrating preforms used in molding optical elements, which are obtained by injection molding in the prior art.
Figure 10B:
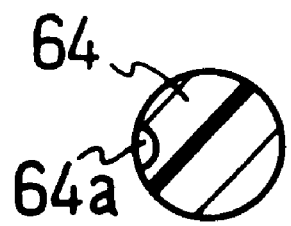

The optical element 28 obtained in this embodiment is not affected by the non-homogeneous distortion of the gate part (the recess 70a near the gate 61), which can be seen in the optical element 70 obtained directly by injection molding as shown in FIG. 9. Furthermore, the optical element 28 has axial symmetry and considerably small distortion over the whole clear aperture.

Table 3 below shows a comparison of the measurement result of distortion of the optical element obtained in this embodiment with that of the conventional optical element molded by using a preform obtained directly by injection molding.

TABLE 3

| Sample No. | Measurement Results of Distortion (nm) | |
|---|---|---|
| | Injection Lens | The Optical Element in this embodiment |
| 1 | 10 | 0 |
| 2 | 15 | 5 |
| 3 | 20 | 0 |
| 4 | 10 | 0 |
| 5 | 15 | 5 |

As shown in Table 3 above, it can be seen that distortion in the whole clear aperture is very small in the optical elements obtained in this embodiment. Consequently, the optical performance is also excellent. On the other hand, in the conventional optical element molded by using a preform obtained directly by injection molding, distortion in the whole clear aperture is large and the optical performance is not stable.

In addition, using the preform obtained by cutting the array 3 shown in FIG. 1 employing the cutting method of a general hand punching at one stroke instead of the vibration-pressure cutting method, an optical element was molded using the same molding method as in this embodiment. As a result, the optical element obtained had a defect in the performance, since there was a rough surface part (having unevenness) of the outer peripheral part of the preform, which got into a clear aperture of the optical element during the molding.

Since the distortion of cut surface was not even at the time of punching, it was clearly found that the preform was deformed into the shape of non-axial symmetry during the heat molding and the optical performance was ultimately not stable.

Table 4 below shows a comparison of the result of performance evaluation of the optical element 28 obtained in this embodiment with that of the optical element obtained employing the same molding method as in this embodiment and using the preform obtained by cutting the array 3 shown in FIG. 1 by hand punching at one stroke.

TABLE 4

| | Results of Aberration Evaluation (RMS λ) | |
|---|---|---|
| Sample No. | Vibration-Pressure Cutting | Punching at One Stroke |
| 1 | 0.03 | 0.06 |
| 2 | 0.028 | 0.065 |
| 3 | 0.025 | 0.075 |
| 4 | 0.032 | 0.058 |
| 5 | 0.035 | 0.084 |

As shown in Table 4 above, it can be seen that the RMS value of the optical element 28 is low and the performance is stable when using the preform obtained by the vibration-pressure cutting method as in this embodiment. On the other hand, the RMS value of optical elements is high and the performance is not stable when using the preform obtained by the hand punching at one stroke.

When the part indicated by a numeral 2 in the array 3 shown in FIG. 1 is not the preform portion but the optical element portion, the optical element obtained by cutting this array by the vibration-pressure cutting method is not affected by the non-homogeneous distortion of the gate part (the recess 70a near the gate 61), which can be seen in the optical element 70 obtained directly by injection molding as shown in FIG. 9. Furthermore, this optical element has axial symmetry and considerably small distortion in whole clear aperture. Consequently, using the array-form preform composed of material for optical elements in which a plurality of optical element portions are connected, and cutting off the optical elements from the array-form preform by vibration-pressure cutting in the first embodiment mentioned above, plural optical elements can be obtained at a time, wherein the distortion not needed optically is small, the cut surface has a specularity and the precision of the outer dimention is excellent.

In this embodiment, the preform 1 is used, which is composed of the spherical part and the edge part of the chip obtained using the array 3, in which a plurality of preform portions 2 used in molding optical elements are connected. However, it is not always limited to the preforms having such a structure. A columnar preform used in molding optical elements also may be used, which is obtained using a plate-form preform. Inexpensive optical elements can be realized by using such a columnar preform obtained using a plate-form preform.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method for manufacturing preforms used in molding optical elements, comprising:

forming array-form preforms made from a material for optical elements, in which a plurality of preform portions used for molding optical elements are connected;

applying vibration to outer peripheral parts of the preform portions in the thickness direction of the array-form preform; and then punching the preform portions and thereby obtaining preforms used for molding optical elements.

2. A method for manufacturing preforms used in molding optical elements according to claim 1, wherein the punching step comprises:

supporting the part being punched with a pair of punches having a recessed portion formed on an end surface;

vibrating the pair of punches in the direction of a central axis; and then moving the pair of punches in the same direction along the central axis.

3. A method for manufacturing preforms used in molding optical elements according to claim 2, further comprising:

providing a pair of dies having a through hole, in which the pair of punches slide;

supporting the preforms that have not been punched yet by the pair of dies; and, after punching the preforms, vibrating the pair of punches in the direction of a central axis.

4. A method for manufacturing preforms used in molding optical elements according to claim 1, wherein the thickness of the preforms that have not been punched yet is between 0.3 mm and 10 mm.

5. A method for manufacturing preforms used in molding optical elements according to claim 1, wherein the material for optical elements is a polyolefin resin.

6. A method for manufacturing preforms used in molding optical elements according to claim 1, wherein the array-form preforms are processed by injection molding and a margin for cutting is provided between a gate portion and a preform portion used in molding optical element.

7. A method for manufacturing optical elements, comprising:

forming array-form preforms made from a material for optical elements, in which a plurality of optical element portions are connected;

applying vibration to the outer peripheral part of the optical element portions in the thickness direction of the array-form preforms; and then punching the optical element portions and thereby obtaining optical elements.

8. A method for manufacturing optical elements according to claim 7, wherein the punching step comprises:

supporting the optical element portions being punched with a pair of punches having a recessed portion is formed on an end surface;

vibrating the pair of punches in the direction of a central axis; and then moving the pair of punches in the same direction along the central axis.

9. A method for manufacturing optical elements according to claim 8, further comprising:

providing a pair of dies having a through hole, in which the pair of punches slide;

supporting the array-form preform by the pair of dies; and, after the punching step, vibrating the pair of punches in the direction of a central axis.

10. A method for manufacturing optical elements according to claim 7, wherein the thickness of the array-form preform is between 0.3 mm and 10 mm.

11. A method for manufacturing optical elements according to claim 7, wherein the material for optical elements is a polyolefin resin.

12. A method for manufacturing optical elements according to claim 7, wherein the array-form preforms are processed by injection molding and a margin for cutting is provided between a gate portion and an optical element portion.

13. A method for molding optical elements, comprising:

forming array-form preforms made from a material for optical elements, in which a plurality of preform portions used for molding optical elements are connected;

applying vibration to outer peripheral parts of the preform portions in the thickness direction of the array-form preforms; then punching the preform portions and thereby obtaining preforms used for molding optical elements; and molding the preforms by applying pressure and heat.

14. A method for molding optical elements according to claim 13, wherein the punching step comprises:

supporting the portion being punched with a pair of punches having a recessed portion formed on an end surface;

vibrating the pair of punches in the direction of a central axis; and then moving the pair of punches in the same direction along the central axis.

15. A method for molding optical elements according to claim 14, further comprising:

providing a pair of dies having a through hole, in which the pair of punches slide;

supporting the preform that has not been punched yet by the pair of dies; and, after the punching step, vibrating the pair of punches in the direction of a central axis.

16. A method for molding optical elements according to claim 13, wherein the thickness of the preforms that have not been punched yet is between 0.3 mm and 10 mm.

17. A method for molding optical elements according to claim 13, wherein an outer diameter Y of a preform used in molding optical elements is determined so that a relationship $E \leq Y \leq X$ holds, wherein E is a diameter of a clear aperture of an optical element and X indicates an outer diameter of the optical element.

18. A method for molding optical elements according to claim 13, wherein the material for optical elements is a polyolefin resin.

19. A method for molding optical elements according to claim 13, wherein the array-form preforms are processed by injection molding and a margin for cutting is provided between a gate portion and a preform portion used in molding an optical element.

* * * * *